March 22, 1960 M. CANDIDO, JR 2,929,491
ARTICLE STORAGE AND FEEDING DEVICE
Filed Sept. 30, 1957 2 Sheets-Sheet 2
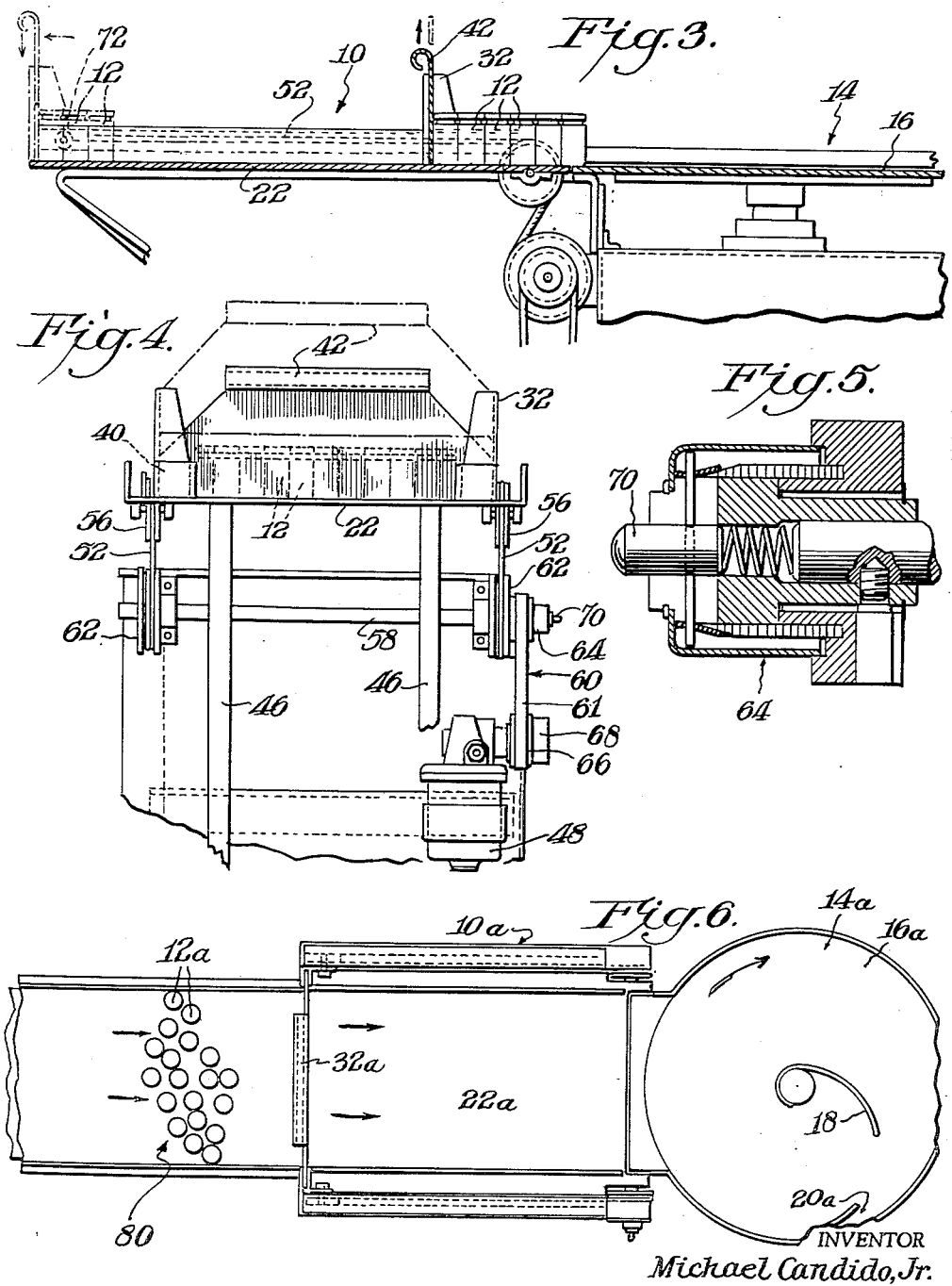
INVENTOR
Michael Candido, Jr.
BY Connolly and Hutz
ATTORNEYS

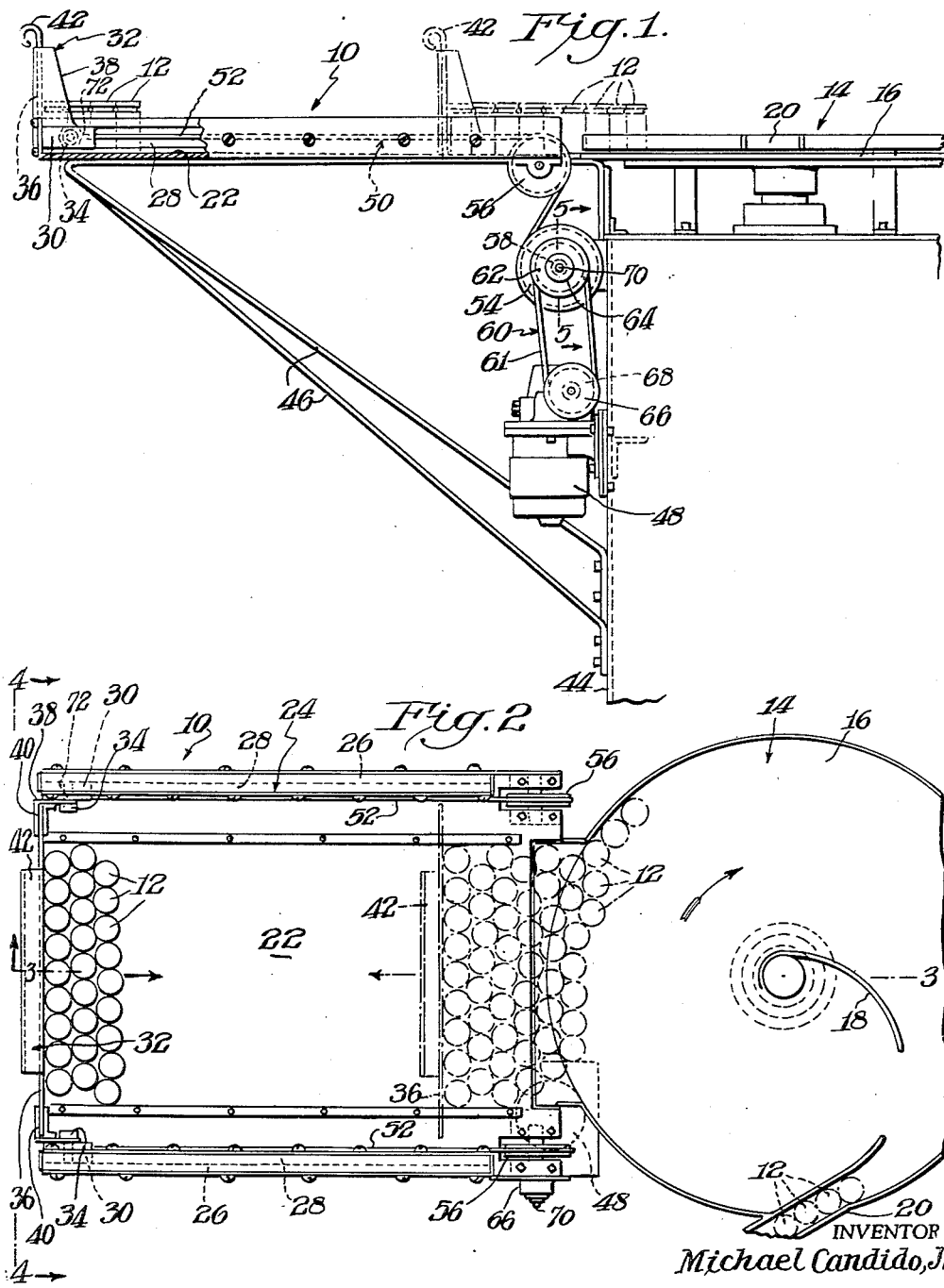

United States Patent Office 2,929,491
Patented Mar. 22, 1960

2,929,491

ARTICLE STORAGE AND FEEDING DEVICE

Michael Candido, Jr., Crestwood, N.Y., assignor to Chas. Pfizer & Co., Inc., Brooklyn, N.Y., a corporation of Delaware Application September 30, 1957, Serial No. 686,963

9 Claims. (Cl. 198—107)

This invention relates to a device for storing and feeding relatively small articles to an article-conveying system, and more particularly relates to a device of the aforementioned type for use in combination with a rotating accumulator table.

Accumulator tables are used in conjunction with article-conveying systems, for example, a system for conveying small glass bottles or vials. Various examples of accumulator tables are described in U.S. Letters Patent Nos. 2,629,481, 2,638,201 and 2,642,173. These accumulator tables build up a cushion or reserve supply of articles which are delivered in continuous streams to the system fed from the table. This feed system may, for example, be a final conveyor system leading to a unit of processing equipment which must be steadily supplied with a stream of articles to take advantage of its full operating capacity.

It is advantageous to have maximum storage area on these accumulator tables to make the reserve supply of articles stored upon them as great as possible. However, the structure and operating characteristics of these rotating tables become complicated, inconvenient and troublesome when a predetermined size of table is exceeded. The peripheral speed, for example, rises appreciably with concomitant complications in article pick-up and structural rigidity. The centrifugal forces inherent in larger tables become prohibitively great which necessitates the use of excessively strong and heavy structural components.

An object of this invention is, therefore, to provide a device for storing and feeding articles to an article-conveying system which is relatively simple and economical in structure.

Another object is to provide such a device whose storage capacity can be increased without undue complication in structure and operation.

In accordance with this invention, a device for storing and feeding articles to an article-conveying system includes a feed table having an open end which is directly connected to the article conveying system. A pusher bar is connected to a source of driving power which moves it within a guide means across the length of the table to push a supply of articles stored in front of it onto the article-conveying system. A transmission means connects the source of driving power to the pusher bar and includes a force-releasing means for preventing the force applied by the pusher bar against the articles from exceeding a predetermined maximum. This prevents the pusher bar from breaking or damaging the articles if a blockage should occur within the article-conveying system.

Novel features and advantages of the present invention will become apparent to one skilled in the art from a reading of the following description in conjunction with the accompanying drawings wherein similar reference characters refer to similar parts and in which:

Fig. 1 is a view in elevation of one embodiment of this invention;

Fig. 2 is a plan view of the embodiment shown in Fig. 1;

Fig. 3 is a cross-sectional view taken through Fig. 2 along the line 3—3 and looking in the direction of the arrows;

Fig. 4 is a cross-sectional view taken through Fig. 2 along the line 4—4 and looking in the direction of the arrows;

Fig. 5 is an enlarged cross-sectional view taken through Fig. 1 along the line 5—5 and looking in the direction of the arrows; and Fig. 6 is a plan view of another embodiment of this invention.

In Figs. 1 and 2 a device 10 for storing and feeding articles, glass bottles or vials 12, is shown connected to an article-conveying system 14, for example an accumulator table 14. Accumulator table 14 includes, for example, a rotating circular table 16, a deflector 18 and a discharge conveyor chute 20. Articles supplied to the accumulator table are thereby channelled successively into the discharge conveyor chute 20 and supplied in a steady stream to a piece processing equipment, for example a filling machine.

The storage area of an accumulator table 14 is substantially supplemented by storage and feeding device 10 which includes a table 22 of considerable area. Guide means 24, for example, incorporating a pair of tracks 26 which include a longitudinal slot or recess 28 are mounted, for example, at the sides of table 22 along substantially the full length of table 22. A pair of shoes 30 are inserted within each of slots 28 with a fit which permits them to slide back and forth along the full length of slots 28.

A pusher bar assembly 32 is fastened to shoes 30, for example, by cap screws 34 in a manner which permits pusher bar assembly 32 to sweep down the entire length of table 22 a short distance above its surface. Pusher bar assembly 32 includes a central section 36 which is substantially vertically and perpendicularly disposed relative to its line of movement along table 22. End sections 38 of assembly 32 are substantially vertically disposed in a plane parallel to the direction of movement of pusher assembly 32. These end sections 38 are constructed and arranged to include a vertically disposed slot 40 within which central section 36 is free to slide upward and downward. This provides a movable connection between the central and end stations which permits the central section 36 to be optionally raised free and clear of the articles 12 on the table for example by grasping handle 42 and lifting. Central section 36 and end sections 38 are, for example, fabricated in the manner shown from sheet steel, for example, 12 or 14 gauge in thickness. These parts may, for example, be made of stainless steel to prevent corrosion, or they may be plated, for example, with nickel and chromium or cadmium.

Table 22 is mounted, for example, on the side of the cabinet of frame work 44 of accumulator table 14, for example, by diagonal braces 46 made of steel bars, for example. A source of driving power 48, for example, a gear-head electric motor is also mounted upon the side of frame work 44. Electric motor 48 is connected, for example, to pusher bar assembly 32 by a power transmission or linkage 50 including a cable 52 wound upon a reel 54. Transmission assembly 50 also includes an idler pulley 56 between assembly 32 and reel 54 which permits cable 52 to extend along the entire length of table 22.

Reel 54 is driven from the rotating shaft 58 of motor 48 through, for example, a pulley and V-belt drive 60. Drive 60 includes, for example, V-belt 61 and pulley 62 which is coupled to reel 54 through a manually actuable means, for example, a manually actuated clutch 64 (later described in detail). Pulley 66 is coupled to electric motor shaft 58 by means of a force-releasing means 68, for example, a slip clutch 68 which can be adjusted to slip and prevent excessive force from being applied to the articles by the forward movement of pusher bar assembly 32.

In Figs. 3, 4 and 5, details of manually actuable clutch 64 and slip clutch 68 are shown. Manually actuable clutch 64, for example, is a No. 2575 spring clutch made by the Marquette Co. Slip clutch 68 is, for example, made by the Hillard Company and may be a No. L-2 model. In Fig. 5, details of manually operated clutch 64 are shown to indicate a pushbutton 70 which permits the clutch to be engaged and disengaged at will. The connection of cables 52 to an intermediate section 72 of cap screws 34 is shown in Figs. 1 and 2. Forward movement of the cable being wound about reel 54 thereby pulls shoes 30 and attached pusher bar assembly 32 forward.

In Fig. 6, a modification 10a of the device shown in Fig. 1 is illustrated. Device 10a is similar to device 10 with the exception that a conveyor belt 80 is connected to the rear end of table 22a which is maintained free and clear of obstruction. This permits a stream of articles 12a to be supplied to table 22a in back of pusher bar assembly 32a. This permits the table to be intermittently supplied as it feeds a steady stream of articles 12a to accumulator table 14a.

Operation

The storage and feeding device 10 shown in Figs. 1–5 greatly supplements the storage capacity of accumulator table 14. Table 22 may be fully loaded by an operator by hand, for example, and the manually actuated clutch 64 engaged by actuation of pushbutton 70. This draws pusher bar assembly 32 steadily forward at a predetermined rate of speed towards accumulator table 14. A relatively great number of articles are thereby stored within the storage and feeding portions of the apparatus for continuous supply to a piece of processing equipment. A great increase in capacity is, therefore, attainable without unduly enlarging and complicating the accumulator table 14 because the length of table 22 can be increased practically indefinitely as long as reel 54 and cables 52 are enlarged and lengthened.

If a blockage should occur, slip clutch 68 releases the force from the electric motor 48 and prevents breakage of articles 12 which are, for example, glass bottles or vials. After the blockage has been cleared, the device automatically resumes its forward feeding movement.

After pusher bar assembly 32 has traversed the full length of the table, manually actuable clutch 64 is disengaged, and the bar assembly 32 drawn back to its original starting position shown in Figs. 1 and 2. If necessary, the bar may be lifted or slid upwards within slots 40 to enable it to clear any articles 12 which may have been interposed on the feeding table. For example, articles may have been manually loaded onto the table in back of the bar by the operator as it is feeding forward. The upper and lower positions of pusher bar assembly 32 relative to articles 12 are illustrated in Figs. 3 and 4.

Fig. 6 illustrates an arrangement in which a conveyor 80 feeds a supply of articles 12a to table 22a in back of the pusher bar. This provides another storage region into which articles, for example, are intermittently transported from an unloading station (not shown). A semi-automatic storage and feeding device of practically unlimited storage capacity is thereby provided.

What is claimed is:

1. A device for storing and feeding articles to an article conveying system comprising a rotating accumulator table, a discharge conveyor chute tangentially disposed adjacent the surface of said table for directing them away from said table, a rectangular feed table connected to a side of said accumulator table, guide means mounted along the length of said feed table, a pusher bar operatively engaged with said guide means and extending across the width of said feed table, a source of driving power, a transmission means connecting said source of driving power with said pusher bar for drawing said pusher bar along said guide means down the length of said feed table towards said accumulator table to continuously push a supply of articles stored in front of said pusher bar upon said feed table towards said accumulator table thereby maintaining a supply of articles continuously fed to said accumulator table and subsequently to said discharge chute, and said transmission means including force-releasing means arranged to slip upon the exceeding of a predetermined force when articles are not removed from said discharge chute as fast as they are supplied to said accumulator table for preventing said push applied by said pusher bar against said articles from exceeding a predetermined maximum force and damaging said articles.

2. A device as set forth in claim 1 wherein said pusher bar includes an end portion engaged with said guide means and a central section which sweeps the surface of said feed table, and movable connecting means joining said central section to said end section for permitting said central section to be optionally raised away from the surface of said table.

3. A device as set forth in claim 1 wherein said guide means is comprised of a pair of tracks mounted along the sides of said feed table.

4. A device as set forth in claim 3 wherein said pusher bar includes a vertical plate, a pair of shoes being attached to the sides of said plate, and said shoes being inserted within said tracks to guide said plate in its movement along the length of said table.

5. A device as set forth in claim 1 wherein said source of driving power includes a rotating element, said transmission means includes a cable, one end of said cable being attached to said pusher bar and the other end of said cable being attached to a reel, and said reel being operatively connected to be driven by said rotating element.

6. A device as set forth in claim 5 wherein said reel is connected to said rotating element by a V-belt and pulley drive, a manually actuable clutch being interposed between said pulley and said reel to permit said reel to be selectively actuated by an operator as said pulley is continuously rotated.

7. A device as set forth in claim 5 wherein said rotating drive element is connected to said source of driving power through a slip clutch to prevent the driving force transmitted to said pusher bar from exceeding a predetermined maximum value.

8. A device as set forth in claim 1 wherein the end of said feed table remote from said accumulator table is unobstructed, an article delivery system is connected to said remote end for delivering a supply of articles to said feed table in back of movable means connecting said pusher bar to said transmission means for permitting said pusher bar to be optionally lifted clear of said articles to allow said bar to be raised and lifted over and in back of said articles supplied by said delivery system after said bar has completed its forward movement.

9. A device for storing and feeding articles to an article-conveying system comprising a feed table, one end of said feed table being unobstructed and constructed and arranged for connection to said article-conveying system to permit articles stored upon said table to be smoothly transferred to said article-conveying system, guide means mounted along the length of said table, a pusher bar operatively engaged with said guide means and extending across the width of said table, a source of driving power, a transmission means connecting said source of driving power with said pusher bar, said transmission means being constructed and arranged to draw said pusher bar along said guide means down the length of said table to push a supply of articles stored in front of said pusher bar upon said table onto said article-conveying system, said transmission means including force-releasing means for preventing the force applied by said pusher bar against said articles from exceeding a predetermined maximum force, said pusher bar including an end portion engaged with said guide means and a central section which sweeps the surface of said feed table, movable connecting means joining said central section to said end section for permitting said central section to be optionally raised away from the surface of said table, and said movable connecting means including a slotted element joined to said end section of said pusher bar for allowing said central section to slide up and down within said slotted element.

References Cited in the file of this patent
UNITED STATES PATENTS

| | | |
|---|---|---|
| 1,582,411 | Lesser | Apr. 27, 1926 |
| 2,629,481 | Stover | Feb. 24, 1953 |
| 2,642,173 | Wehmiller | June 16, 1953 |
| 2,644,734 | Gabrielsen | July 7, 1953 |
| 2,808,921 | Knowles | Oct. 8, 1957 |